(12) United States Patent
Bent

(10) Patent No.: US 10,297,171 B2
(45) Date of Patent: May 21, 2019

(54) LABELS SUBJECT OF CONDENSATION

(75) Inventor: Huig Bent, Katwijk Aan Zee (NL)

(73) Assignee: Avery Dennison Corporation, Glendale, CA (US)

( * ) Notice: Subject to any disclaimer, the term of this patent is extended or adjusted under 35 U.S.C. 154(b) by 1259 days.

(21) Appl. No.: 14/236,780

(22) PCT Filed: Jul. 31, 2012

(86) PCT No.: PCT/US2012/049004
§ 371 (c)(1),
(2), (4) Date: Feb. 3, 2014

(87) PCT Pub. No.: WO2013/019799
PCT Pub. Date: Feb. 7, 2013

(65) Prior Publication Data
US 2014/0154442 A1    Jun. 5, 2014

Related U.S. Application Data

(60) Provisional application No. 61/513,912, filed on Aug. 1, 2011.

(51) Int. Cl.
*B32B 38/10*    (2006.01)
*A61J 1/18*    (2006.01)
(Continued)

(52) U.S. Cl.
CPC ............. *G09F 3/0288* (2013.01); *A61J 1/10* (2013.01); *A61J 1/18* (2013.01); *B32B 38/10* (2013.01);
(Continued)

(58) Field of Classification Search
CPC . G09F 3/02; G09F 3/0288; G09F 3/10; G09F 2003/0214; G09F 2003/216;
(Continued)

(56) References Cited

U.S. PATENT DOCUMENTS 4,057,029 A * 11/1977 Seiter ........................ G01K 3/04
116/207
4,526,404 A * 7/1985 Vazquez ................ A61G 12/00
206/232

(Continued)

FOREIGN PATENT DOCUMENTS

CN    201820397       5/2011
CN    202003602 U  * 10/2011
(Continued)

OTHER PUBLICATIONS

International Search Report and Written Opinion dated Oct. 18, 2012 issued in corresponding International Application No. PCT/US2012/049004 filed Jul. 31, 2012.
(Continued)

*Primary Examiner* — Lee E Sanderson
(74) *Attorney, Agent, or Firm* — Avery Dennison Corporation

(57) ABSTRACT

Label systems for cold environment use and application are described. The label systems comprise a first label assembly adhered to an article subjected to cold temperatures and a second label assembly that is readily applied to the first label assembly, and particularly when the first label assembly is at a relatively cold temperature. The label systems described are particularly well suited for labeling blood bags and other articles subjected to cold storage.

9 Claims, 7 Drawing Sheets

(51) Int. Cl.
  *G09F 3/00* (2006.01)
  *G09F 3/10* (2006.01)
  *A61J 1/10* (2006.01)
  *G09F 3/02* (2006.01)

(52) U.S. Cl.
  CPC .................. *G09F 3/02* (2013.01); *G09F 3/10* (2013.01); *A61J 2205/30* (2013.01); *F04C 2270/041* (2013.01); *G09F 2003/0216* (2013.01); *Y10T 428/1334* (2015.01); *Y10T 428/14* (2015.01); *Y10T 428/1476* (2015.01); *Y10T 428/2848* (2015.01)

(58) Field of Classification Search
  CPC ......... G09F 2003/0257; Y10T 428/149; Y10T 428/1476; B32B 7/06; B32B 7/12; B32B 2519/00; B32B 38/10
  USPC ............ 383/81; 283/71–114; 428/41.7, 42.2, 428/42.3
  See application file for complete search history.

(56) References Cited

U.S. PATENT DOCUMENTS

| | | | | |
|---|---|---|---|---|
| 4,526,405 | A * | 7/1985 | Hattemer | B31D 1/021 283/81 |
| 4,824,702 | A | 4/1989 | Straub | |
| 5,125,920 | A * | 6/1992 | Ishida | A61J 1/10 604/408 |
| 5,350,612 | A * | 9/1994 | Stern | B65D 23/14 162/165 |
| 5,623,011 | A | 4/1997 | Bernard | |
| 5,728,469 | A | 3/1998 | Mann et al. | |
| 5,830,571 | A | 11/1998 | Mann et al. | |
| 6,068,037 | A | 5/2000 | Yeager et al. | |
| 6,147,165 | A | 11/2000 | Lee et al. | |
| 6,486,267 | B1 | 11/2002 | Bilodeau | |
| 6,506,489 | B1 | 1/2003 | Ohura et al. | |
| 2001/0052386 | A1* | 12/2001 | Treleaven | B31D 1/021 156/248 |
| 2004/0129377 | A1 | 7/2004 | Felder | |
| 2005/0071044 | A1* | 3/2005 | Yonge | G09F 3/0288 700/215 |
| 2005/0074549 | A1 | 4/2005 | Su et al. | |
| 2006/0188713 | A1 | 8/2006 | Ko | |
| 2009/0211705 | A1* | 8/2009 | Tonniessen | C09J 153/02 156/332 |

FOREIGN PATENT DOCUMENTS

| | | |
|---|---|---|
| JP | 1989-118187 | 5/1989 |
| JP | 2001003010 | 1/2001 |
| JP | 2011148856 | 8/2011 |
| WO | 2004/082931 | 9/2004 |
| WO | 2012/085204 | 6/2012 |

OTHER PUBLICATIONS

International Preliminary Report on Patentability dated Feb. 4, 2014 issued in corresponding International Application No. PCT/US2012/049004 filed Jul. 31, 2012.

* cited by examiner

LABELS SUBJECT OF CONDENSATION

CROSS REFERENCES TO RELATED APPLICATIONS

The present application is a 371 of International Application No. PCT/US2012/049004, which published in English of Feb. 7, 2013, which claims the benefit of U.S. Provisional Patent Application No. 61/513,912 filed Aug. 1, 2011, both of which are incorporated herein by reference in their entireties.

FIELD

The present subject matter relates to label systems adapted for use and application in cold temperatures and environments of changing temperature. The label systems find particular application in medical uses such as labeling blood bags and in cold temperature food storage applications.

BACKGROUND

Blood transfusion is a well known therapeutic process. The purpose of a transfusion is to provide blood component (s) that will improve the physiological status of a patient. Various blood components can be harvested from a single donation of whole blood. Most blood banks are able to separate red cells and plasma components. Others are able to prepare components such as platelet concentrates and cryoprecipitate. Whole blood and/or its components are typically stored in blood bags.

The collection of blood from donors may take place within a blood transfusion center or hospital blood bank. Blood is also often collected from donors during mobile blood collection sessions. The blood is then taken to a laboratory for testing and processing into components and for storage and distribution as the need arises.

Blood is collected at body temperature, i.e. +37° C. But in order to maintain its vital properties, it must be cooled to below +10° C. to be transported, and stored at refrigeration temperatures of around +4° C. until use. If blood is stored or transported outside of these temperatures for long periods of time, it loses its ability to transport oxygen or carbon dioxide to and from tissues respectively upon transfusion. Other factors of serious concern are the risk of bacterial contamination if blood is exposed to warm temperatures.

More specifically, whole blood and red cells must always be stored at a temperature between +2° C. and +6° C. If blood is not stored at between +2° C. and +6° C., its oxygen-carrying ability is greatly reduced. Another important reason for storing blood between +2° C. and +6° C. is to keep the growth of any bacterial contamination in the unit of blood to a minimum. If blood is stored above +6° C., bacteria that may have inadvertently entered the unit during collection may grow to such an extent that transfusion of the contaminated blood could be fatal. The lower limit of +2° C. is also very important. This is because red cells are very sensitive to freezing. If they are allowed to freeze, the red cell membranes rupture and the hemoglobin is released; that is, the cells are hemolysed. The transfusion of hemolysed blood can also be fatal.

Fresh frozen plasma (FFP) is plasma that has been separated from a unit of whole blood within 6 to 8 hours of collection, and has been rapidly frozen and maintained at all times at a temperature of −20° C. or lower. There is no lower temperature limit for the storage of FFP, although the optimal temperature is −30° C. or lower.

Plasma contains water, electrolytes, clotting factors and other proteins (mostly albumin), most of which are stable at refrigerator temperature, i.e. +2° C. to +6° C. Factor V and Factor VIII, however, which are essential in the clotting mechanism, will deteriorate and diminish in quantity if they are not stored at −20° C. or lower and greatly reduce the clotting activity of the plasma. FFP may be given to a patient to restore or help to maintain coagulation factors such as Factor V or Factor VIII.

Cryoprecipitate is the cold insoluble portion of plasma remaining after FFP has been thawed between +1° C. and +6° C. and is useful for correcting certain coagulation defects. It contains approximately 50% of Factor VIII and von Willebrand Factor, 20-40% of fibrinogen and some of the Factor XIII originally present in the fresh plasma.

Plasma is separated from red cells within 6 to 8 hours of collecting blood. The plasma is frozen solid rapidly, certainly within 30 minutes of separation from the cells. The plasma is then thawed slowly at below +4° C. In order to obtain the maximum yield of Factor VIII in the cryoprecipitate from a blood unit it is important to adhere strictly to standard procedures for the collection, storage and processing of the component. The stability on storage is dependent on the storage temperature available. The optimal storage temperature is below −30° C.

In view of these requirements, whole blood and packed red cells must be stored at +2° C. to +6° C. and transported between +2° C. and transported between +2° C. to +10° C. The optimal storage temperature for fresh frozen plasma and cryoprecipitate is −30° C., and they must always be frozen solid.

Blood bags containing whole blood and/or blood components are typically labeled. Current practice employs origination labels that are affixed to a blood bag which identifies its origin, contents, date, and other items. These labels remain attached to the blood bags during cold storage and up to and during the time at which the blood bag is removed from cold storage and allowed to thaw or increase in temperature prior to use.

At some point prior to accessing the contents of a blood bag, typically current practice involves attaching one or more supplemental labels to the blood bag. Typically, the supplemental label is placed on the origination label. These supplemental labels include information concerning the patient or intended recipient of the blood or blood component. A problem frequently encountered is that the blood bags, having recently been removed from cold storage, contain condensation or a layer of frost or ice crystals (depending upon the temperature of the bag) along the outer surface of the bag and label. This layer of condensation or frost significantly interferes with application of supplemental labels to the blood bags, and particularly to an outer face of the origination label.

Thus, prior to application of a supplemental label, a medical practitioner must wipe away any moisture or frost residing in the region of supplemental label application. As will be appreciated, this is undesirable particularly when in an emergency situation. Furthermore, even if wiping or other efforts are performed, in many instances moisture still remains along the bag and label outer face which can interfere with application of one or more supplemental labels. In view of this, it will be appreciated that an alternative labeling strategy is needed.

A wide array of other articles and products are known which are subjected to some type of cold storage and then after being removed from the cold environment are warmed to some degree. It is frequently desirable to apply a label to the articles or products after removal from the cold environment. These articles or products are also susceptible to formation of condensation or frost along their outer surface. As previously explained, such condensation or frost interferes with labeling. Accordingly, new strategies are needed for labeling such goods.

SUMMARY

The difficulties and drawbacks associated with previous practices and goods are overcome in the present label systems, labeled goods, and related methods.

In one aspect, the present subject matter provides a label system comprising a first label assembly adapted for use in cold environments. The first label assembly comprises an inner substrate, an outer substrate, a layer of adhesive disposed between the inner substrate and the outer substrate, and a layer of adhesive disposed along an underside of the inner substrate. The label system also comprises a supplemental label assembly configured for application to the first label assembly. The supplemental label assembly comprises an outer substrate, and a layer of adhesive disposed along an underside of the outer substrate of the supplemental label assembly.

In another aspect, the present subject matter provides a labeled blood bag defining an outer surface and a label system including label assembly. The first label assembly comprises an inner substrate, a layer of adhesive disposed between the inner substrate and the outer surface of the blood bag, an outer substrate, and a layer of adhesive disposed between the inner substrate and the outer substrate. The supplemental label assembly comprises an outer substrate, and a layer of adhesive disposed along an underside of the outer substrate of the supplemental label assembly.

In another aspect, the present subject matter provides a method for labeling a blood bag. The method comprises applying a first label assembly to an outer surface of the blood bag. The first label assembly includes an inner substrate, an outer substrate, a layer of adhesive disposed between the inner substrate and the outer substrate, and a layer of adhesive disposed along an underside of the inner substrate. The first label assembly is applied to the outer surface of the blood bag by contacting the layer of the adhesive disposed along an underside of the inner substrate to the outer surface of the blood bag. The method also comprises removing the outer substrate of the first label assembly from the first label assembly applied to the outer surface of the blood bag, to thereby expose a face of the adhesive disposed along the inner substrate. The method also comprises applying a supplemental label assembly to the face of the adhesive of the first label assembly. The supplemental label assembly includes an outer substrate and a layer of adhesive disposed along an underside of the outer substrate of the supplemental label assembly. The supplemental label assembly is applied to the first label assembly by contacting the layer of the adhesive of the supplemental label assembly to the layer of the adhesive disposed along the inner substrate of the first label assembly.

In another aspect, the subject matter provides a label system that comprises a first label assembly adapted for use in cold environments. The first label assembly comprises an inner substrate, a release liner, a layer of adhesive disposed between the inner substrate and the release liner, and a layer of adhesive disposed along an underside of the inner substrate. The label system also comprises a supplemental label assembly configured for application to the first label assembly. The supplemental label assembly comprises an outer substrate, and a layer of adhesive disposed along an underside of the outer substrate of the supplemental label assembly.

In another aspect, the present subject matter provides a labeled article defining an outer surface and a label system including a first label assembly adhered to the outer surface and a supplemental label assembly. The first label assembly comprises an inner substrate, a layer of adhesive disposed between the inner substrate and the outer surface of the article, a release liner, and a layer of adhesive disposed between the inner substrate and the release liner. The supplemental label assembly comprises an outer substrate, and a layer of adhesive disposed along an underside of the outer substrate of the supplemental label assembly.

In another aspect, the present subject matter provides a method for labeling an article. The method comprises applying a first label assembly to an outer surface of the article. The first label assembly includes an inner substrate, a release liner, a layer of adhesive disposed between the inner substrate and the release liner, and a layer of adhesive disposed along an underside of the inner substrate. The first label assembly is applied to the outer surface of the article by contacting the layer of the other adhesive disposed along an underside of the inner substrate to the outer surface of the article. The method also comprises removing the release liner of the first label assembly from the first label assembly applied to the outer surface of the article, to thereby expose a face of the adhesive disposed along the inner substrate. The method also comprises applying a supplemental label assembly to the face of the adhesive disposed along the inner substrate of the first label assembly. The supplemental label assembly includes an outer substrate and a layer of adhesive disposed along an underside of the outer substrate of the supplemental label assembly. The supplemental label assembly is applied to the first label assembly by contacting the layer of the adhesive of the supplemental label assembly to the layer of the adhesive disposed along the inner substrate of the first label assembly.

In another aspect, the present subject matter provides a label system comprising a transfer tape assembly adapted for use in cold environments. The transfer tape assembly comprises an outer release liner, and a layer of adhesive disposed along the outer release liner. The label system also comprises a supplemental label assembly configured for application to the transfer tape assembly. The supplemental label assembly comprises an outer substrate, and a layer of adhesive disposed along an underside of the outer substrate of the supplemental label assembly.

In another aspect, the present subject matter provides a labeled article defining an outer surface and a label system including a transfer tape assembly adhered to the outer surface and a supplemental label assembly. The transfer tape assembly comprises an outer release liner, and a layer of adhesive disposed between the outer release liner and the outer surface of the article. The supplemental label assembly comprises an outer substrate, and a layer of adhesive disposed along an underside of the outer substrate of the supplemental label assembly.

In yet another aspect, the present subject matter provides a method for labeling an article. The method comprises applying a transfer tape assembly to an outer surface of the article. The transfer tape assembly includes an outer release liner, and a layer of adhesive disposed along the outer release liner. The transfer tape assembly is applied to the outer surface of the article by contacting the layer of the adhesive to the outer surface of the article. The method also comprises removing the outer release liner of the transfer tape assembly from the transfer tape assembly applied to the outer surface of the article, to thereby expose a face of the adhesive. The method also comprises applying a supplemental label assembly to the face of the adhesive of the transfer tape assembly. The supplemental label assembly includes an outer substrate and a layer of adhesive disposed along an underside of the outer substrate of the supplemental label assembly. The supplemental label assembly is applied to the transfer tape assembly by contacting the layer of the adhesive of the supplemental label assembly to the layer of the adhesive of the transfer tape assembly.

In yet another aspect, the subject matter provides a label system comprising a dry peel label assembly adapted for use in cold environments. The dry peel label assembly comprises a layer of adhesive, a face material, and a layer of a dry peel coating disposed between the adhesive and the face material. The label system also comprises a supplemental label assembly configured for application to the dry peel label assembly. The supplemental label assembly comprises an outer substrate, and a layer of adhesive disposed along an underside of the outer substrate of the supplemental label assembly.

In another aspect, the present subject matter provides a labeled article defining an outer surface and a label system including a dry peel label assembly adhered to the outer surface and a supplemental label assembly. The dry peel label assembly comprises a dry peel coating, a layer of adhesive disposed between the dry peel coating and the outer surface of the article, and a face material. The label system also includes the supplemental label assembly comprising an outer substrate, and a layer of adhesive disposed along an underside of the outer substrate of the supplemental label assembly.

In another aspect, the present subject matter provides a method for labeling an article. The method comprises applying a dry peel label assembly to an outer surface of the article. The dry peel label assembly includes a dry peel coating, a face material, and a layer of adhesive disposed along an underside of the dry peel coating. The dry peel label assembly is applied to the outer surface of the article by contacting the layer of the adhesive to the outer surface of the article. The method also comprises removing the face material and at least a portion of the dry peel coating from the dry peel label assembly applied to the outer surface of the article, to thereby expose a remaining portion of the dry peel coating. The method also comprises applying a supplemental label assembly to the face of the remaining portion of the dry peel coating of the dry peel label assembly. The supplemental label assembly includes an outer substrate and a layer of adhesive disposed along an underside of the outer substrate of the supplemental label assembly. The supplemental label assembly is applied to the dry peel label assembly by contacting the layer of the adhesive of the supplemental label assembly to the remaining portion of the dry peel label assembly.

In another aspect, the present subject matter provides a label system comprising an ice removing label assembly adapted for use in cold environments. The ice removing label assembly comprises a face material, and a layer of adhesive disposed along the face material. The label system also comprises a supplemental label assembly configured for application to the ice removing label assembly. The supplemental label assembly comprises an outer substrate, and a layer of adhesive disposed along an underside of the outer substrate of the supplemental label assembly.

In another aspect, the present subject matter provides a labeled article defining an outer surface and a label system including an ice removing label assembly adhered to the outer surface and a supplemental label assembly. The ice removing label assembly comprises a face material, and a layer of adhesive disposed between the face material and the outer surface of the article. The supplemental label assembly comprises an outer substrate, and a layer of adhesive disposed along an underside of the outer substrate of the supplemental label assembly.

In yet another aspect, the present subject matter provides a method for labeling an article. The method comprises applying an ice removing label assembly to an outer surface of the article. The ice removing label assembly includes a face material, and a layer of adhesive disposed along an underside of the face material. The ice removing label assembly is applied to the outer surface of the article by contacting the layer of the adhesive to the outer surface of the article. The method also comprises removing the face material and the layer of adhesive of the ice removing label assembly from the outer surface of the article, to thereby expose a region of the article. The method also comprises applying a supplemental label assembly to the region of the article. The supplemental label assembly includes an outer substrate and a layer of adhesive disposed along an underside of the outer substrate of the supplemental label assembly. The supplemental label assembly is applied to the region of the article by contacting the layer of the adhesive of the supplemental label assembly to the region of the article.

As will be realized, the subject matter is capable of other and different embodiments and its several details are capable of modifications in various respects, all without departing from the subject matter. Accordingly, the drawings and description are to be regarded as illustrative and not restrictive.

DETAILED DESCRIPTION OF THE EMBODIMENTS

The present subject matter provides unique label systems particularly adapted for articles to be subjected to varying temperatures and particularly for labeled articles stored at low temperatures and then warmed prior to or during supplemental labeling.

Specifically, the present subject matter is directed to label systems and labeling strategies for blood bags. The label systems generally include an initial or origination label which accompanies the blood bag during cold storage, and one or more supplemental labels that are attached to the blood bags after removal from cold storage. The origination label includes an outer layer that can be readily removed after the labeled blood bag is removed from cold storage. Removal of the outer layer also removes any condensation or frost layer that may have accumulated along the outer layer as the blood bag thaws or otherwise increases in temperature after removal from cold storage. After removal of the outer layer, a fresh receiving surface of the origination label is exposed to which is then applied, the supplemental label.

The term "blood bag" as used herein refers to any container such as a flexible wall bag, pouch, or enclosure typically used in the medical arts to store and/or transport whole blood and/or blood components. Although the subject matter is described in conjunction with labeling blood bags, it will be understood that the subject matter is applicable to other containers or the like used in the medical field. Furthermore, as will be appreciated from the description of other embodiments herein, the subject matter is applicable to a wide array of other applications outside of the medical field.

In one preferred embodiment, a label system and/or a blood bag utilizing such label system are provided. Moreover, various methods related to the label system and labeled blood bag are also provided. Referring to FIGS. 1-6, a preferred embodiment label system comprises a first label assembly 5 and a supplemental label assembly 25 configured to be used with the first label assembly 5. The first label assembly 5 or origination label as previously described is used for initial application to a blood bag such as for identifying the contents of the blood bag prior to cold storage. As will be appreciated, examples of such identification may include blood type, donor information, and so forth. The supplemental label assembly 25 is used for subsequent application to the blood bag, and particularly to the first label assembly 5 applied to the blood bag. The supplemental label assembly 25 is adapted for application to the first label assembly 5 when at cold temperatures, as described in detail herein.

Figure 1:
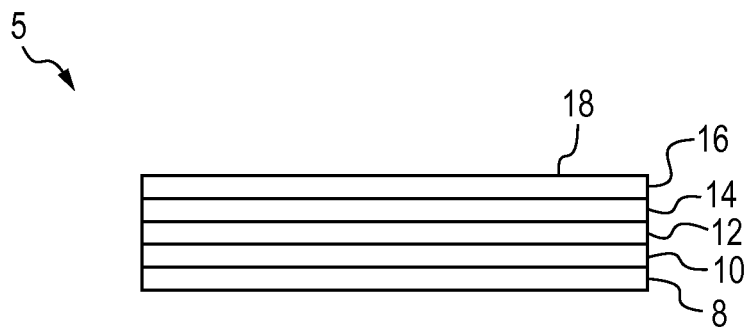
FIG. 1 is a schematic cross sectional view of a first label assembly of a preferred embodiment label system in accordance with the present subject matter.

The first label assembly 5 is shown in FIG. 1 and comprises an inner substrate 12 and an outer substrate 16 with a layer of an adhesive 14 disposed between the inner and outer substrates 12 and 16. Disposed along an underside of the inner substrate 12 is a layer of a first adhesive 10 covered with a release liner 8. The first label assembly can be supplied in a wide array of forms such as in sheets or rolls of web containing a plurality of precut label assemblies 5 on a suitable carrier. The first label assembly 5 defines an outer face 18 preferably along the outer substrate 16. The outer face is preferably adapted to receive printing or writing such as for identification purposes. It will be understood that although the first label assembly 5 is illustrated as a single or unitary collection of layers, that label assembly could be provided in two or more components, stages, or portions. Furthermore, in certain versions, the inner substrate 12 may include printing, markings, indicia or other information. For example, markings may be applied to the inner substrate 12 to provide information such as lot number or the like.

Figure 2:
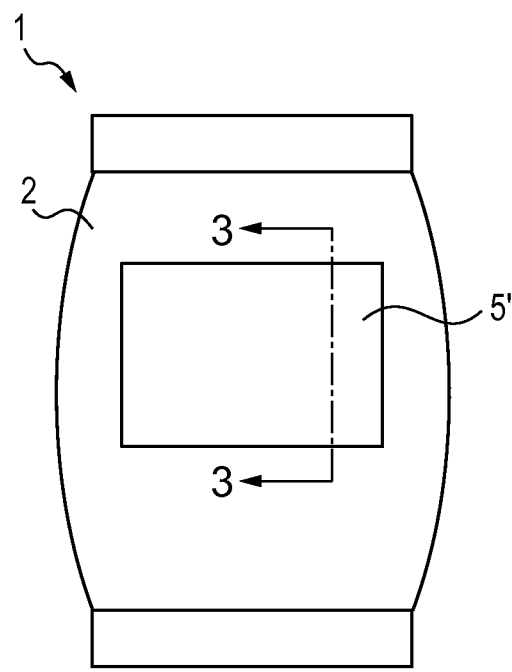
FIG. 2 is a schematic front view of a blood bag labeled with the first label assembly.
Figure 3:
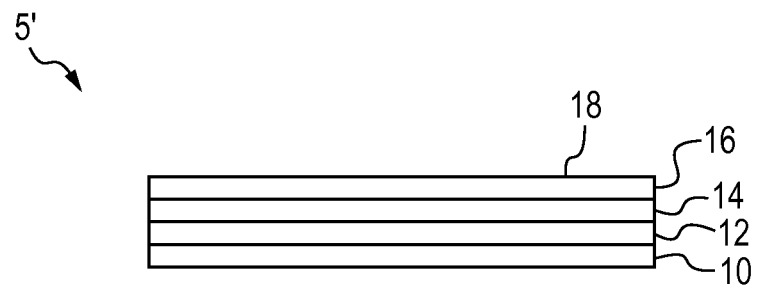
FIG. 3 is a schematic cross sectional view of the first label assembly as applied to the blood bag, taken across line 3-3 in FIG. 2.

FIG. 2 illustrates a blood bag 1 having an outer surface 2 and the first label assembly 5 adhered thereto. Referring to FIG. 2, the first label assembly 5 is applied to the outer surface 2 of the blood bag 1 by removal of the release liner 8 shown in FIG. 1 to thereby expose the first adhesive 10. After removal of the release liner 8, the first label assembly is designated as 5'. The first label assembly 5' is applied to the outer surface 2 of the blood bag 1 to produce the labeled blood bag depicted in FIG. 2. After application of the first label assembly 5' to the blood bag 1, as shown in FIG. 2, the first label assembly 5' is illustrated in the schematic cross sectional view of FIG. 3.

Typically, after application of the first label assembly 5 to the blood bag 1 such as to identify the blood type and other characteristics, the labeled blood bag is placed in cold storage. As previously noted, the temperature of such cold storage is typically less than 10° C., in certain applications less than 6° C., and in certain applications about −30° C. or lower.

When it is desired to access or use the blood or blood components contained within the labeled blood bag, the bag is removed from cold storage and brought to ambient temperatures. Warming or thawing of the labeled bag typically results in condensation and frequently, depending upon the temperature of the cold storage, formation of a layer of ice crystals along exposed regions of the labeled blood bag. As previously described, typically such condensation and/or ice crystals hinder adhesive attachment of any other labels to the bag.

Figure 4:
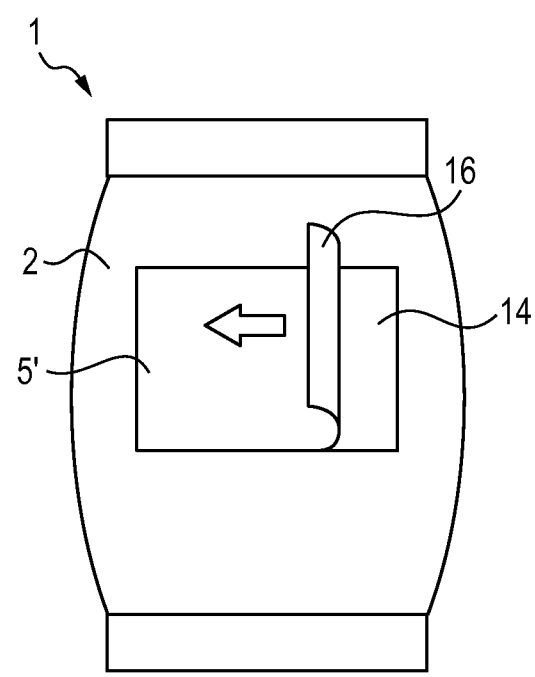
FIG. 4 is a schematic front view of the labeled blood bag of FIG. 2 and removal of an outer substrate from the first label assembly.

FIG. 4 illustrates a significant feature of the first label assembly 5'. The outer substrate 16 of the first label assembly 5' is removed to thereby expose the layer of the adhesive 14.

Figure 5:
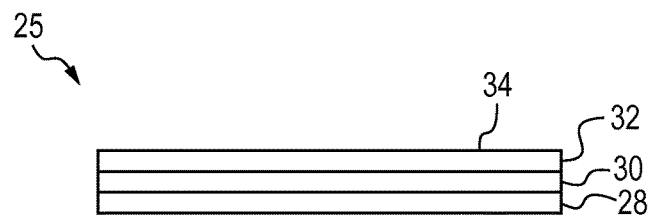
FIG. 5 is a schematic cross sectional view of a supplemental label assembly of a preferred embodiment label system in accordance with the present subject matter.

FIG. 5 illustrates the supplemental label assembly 25 of the preferred embodiment label system. The supplemental label assembly 25 comprises an outer substrate 32 having a layer of a second adhesive 30 disposed along the underside of the outer substrate 32. A release liner 28 preferably covers the otherwise exposed face of the second adhesive 30. The outer substrate 32 provides an outer face 34 which is adapted for receiving printing or other indicia such as for identifying the recipient of the contents of the labeled blood bag 2. The supplemental label assembly can be supplied in a wide array of forms such as in sheets or rolls of web containing a plurality of precut label assemblies on a suitable carrier.

Figure 6:
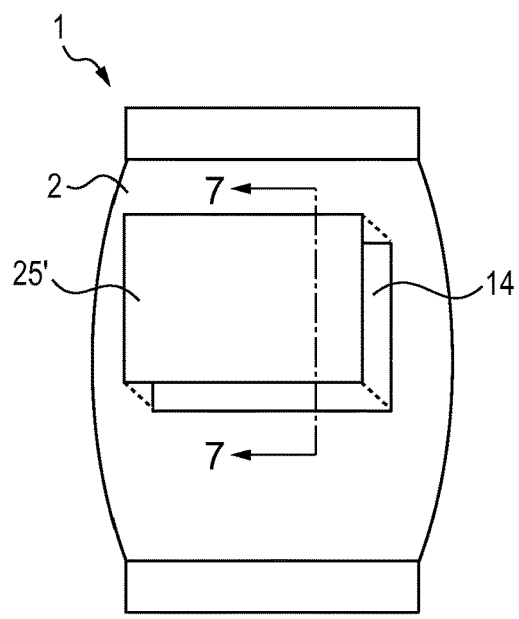
FIG. 6 is a schematic front view of the labeled blood bag of FIG. 4 and application of the supplemental label assembly thereto.

FIG. 6 illustrates application of the supplemental label assembly having the release liner 28 removed (the supplemental label assembly now designated as label assembly 25') to the exposed face of the adhesive 14 of the first label assembly 5' attached to the blood bag 2. Upon application of the supplemental label assembly 25', an exposed face of the second adhesive 30 of the supplemental label assembly 25' is contacted with the exposed face of the adhesive 14 of the applied first label assembly 5'.

Figure 7:
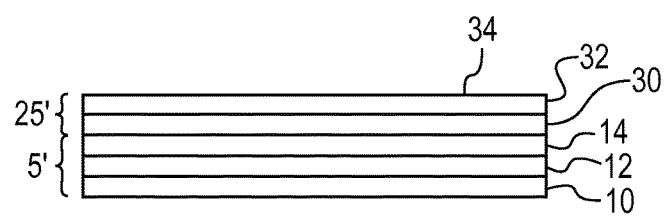
FIG. 7 is a schematic cross sectional view of the resulting collection of label layers on the blood bag of FIG. 6 after application of the supplemental label assembly, taken across line 7-7 in FIG. 6.
Figure 8:
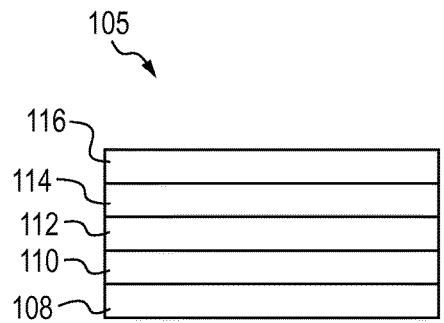
FIG. 8 is a schematic cross sectional view of another first label assembly of another preferred embodiment label system in accordance with the present subject matter.

FIG. 7 is a schematic cross sectional view of the resulting collection of label assemblies 25' and 5' after application of the supplemental label assembly 25' to the first label assembly 5'. Specifically, the first adhesive 10 serves to adhere the inner substrate 12 and layer collection to the outer surface 2 of the blood bag 1. The layers of the adhesive 14 and the second adhesive 30 preferably contact one another and provide enhanced retention of the outer substrate 32 and any printing or other identification along the outer face 34 to the blood bag 2.

In another preferred embodiment, a label system and/or an article utilizing the label system are provided. Furthermore, various methods related to the labeled system and labeled article are provided. Referring to FIGS. 8-11, a preferred embodiment label system comprises a first label assembly 105 and a supplemental label assembly 125 configured for use with the first label assembly 105. The first label assembly 105 is used for labeling an article to be placed in cold storage. The first label assembly 105 shown in FIG. 8 comprises an outer release liner 116, a layer of a first adhesive 114, a substrate 112 such as paper, a layer of another adhesive 110, and another or inner release liner 108.

Figure 9:
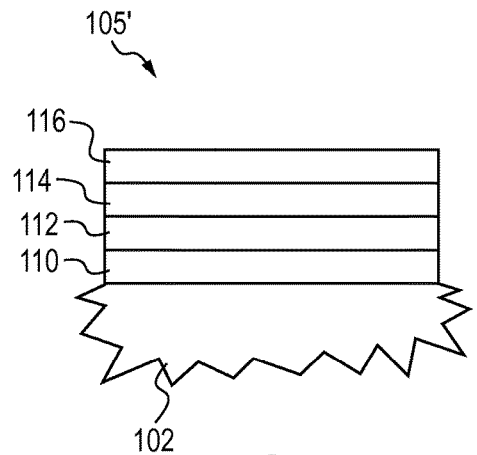
FIG. 9 is a schematic cross sectional view of the first label assembly depicted in FIG. 8 attached to a substrate.

FIG. 9 illustrates application of the first label assembly to an article or substrate 102. Prior to application, the release liner 108 is removed to thereby expose the adhesive 110. The adhesive 110 bonds or adheres the first label assembly to the substrate 102. After removal of the release liner 108, the first label assembly is designated as 105' in FIG. 9.

After removal of the labeled article or substrate from cold storage and exposure to warmer temperatures, as explained herein, typically a layer of moisture accumulates along an outer face of the outer release liner 116. Depending upon the temperature of the first label 105' and the substrate 102, the moisture may be in the form of liquid water or ice crystals. This layer of moisture is shown in FIG. 10 as layer 119.

Figure 10:
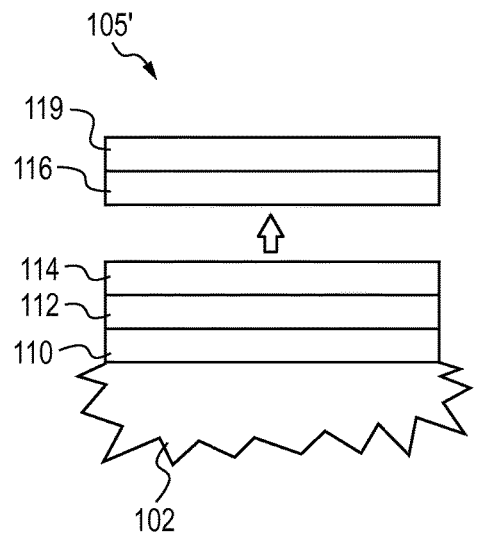
FIG. 10 is a schematic cross sectional view of the first label assembly of FIG. 9 and removal of an outer layer and a layer of moisture such as condensation or frost.

FIG. 10 illustrates removal of the layer of moisture 119 by removing the outer release liner 116 from the remaining portion of the first label assembly 105'.

Figure 11:
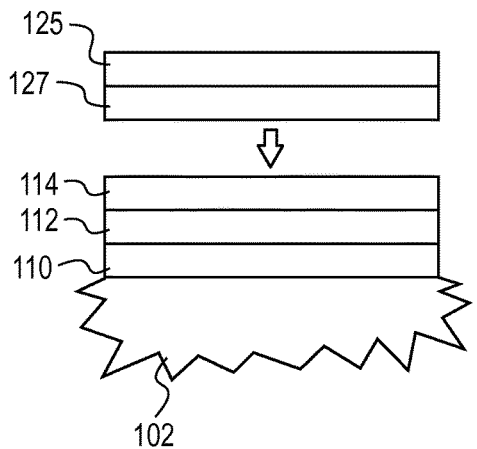
FIG. 11 is a schematic cross sectional view of application of a supplemental label assembly to the first label assembly of FIG. 10.
Figure 12:
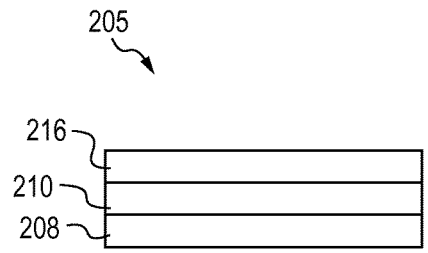
FIG. 12 is a schematic cross sectional view of a transfer tape assembly of another preferred embodiment label system in accordance with the present subject matter.

FIG. 11 illustrates application of a supplemental label assembly 125 having an exposed layer of a second adhesive 127 disposed along an underside of the label assembly 125. It will be appreciated that the supplemental label assembly 125 can include, and preferably includes, additional layers and components. These additional layers and components are collectively referenced by item 125. The supplemental label assembly 125 is then adhered to the remaining portion of the first label assembly 105' adhered to the substrate 102. Preferably, the layer of the second adhesive 127 of the supplemental label assembly 125 is contacted with the layer of the first adhesive 114 of the remaining portion of the first label assembly 105' adhered to the substrate 102.

In another preferred embodiment, a label system and/or an article utilizing the label system are provided. Furthermore, various methods related to the label system and labeled article are provided. Referring to FIGS. 12-15, a preferred embodiment label system comprises a transfer tape assembly 205 and a supplemental label assembly 225 configured for use with the transfer tape assembly 205. The transfer tape assembly 205 is used for labeling an article to be placed in cold storage. The transfer tape assembly 205 shown in FIG. 12 comprises an outer release liner 216, a layer of an adhesive 210, and a release liner 208.

Figure 13:
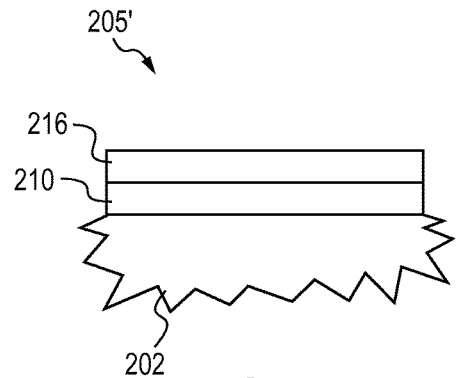
FIG. 13 is a schematic cross sectional view of the transfer tape assembly depicted in FIG. 12 attached to a substrate.

FIG. 13 illustrates application of the transfer tape assembly to an article or substrate 202. Prior to application, the release liner 208 is removed to thereby expose the adhesive 210. The adhesive 210 bonds or adheres the transfer tape assembly to the substrate 202. After removal of the release liner 208, the transfer tape assembly is designated as 205' in FIG. 13.

After removal of the labeled article or substrate from cold storage and exposure to warmer temperatures, as explained herein, typically a layer of moisture accumulates along an outer face of the outer release liner 216. Depending upon the temperature of the transfer tape 205' and the substrate 202, the moisture may be in the form of liquid water or ice crystals. This layer of moisture is shown in FIG. 14 as layer 219.

Figure 14:
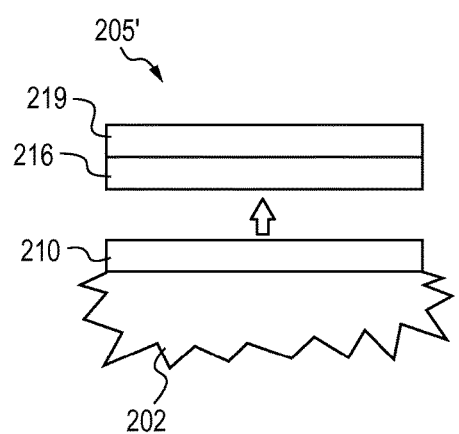
FIG. 14 is a schematic cross sectional view of the transfer tape assembly of FIG. 13 and removal of an outer layer and a layer of moisture such as condensation or frost.

FIG. 14 illustrates removal of the layer of moisture 219 by removing the outer release liner 216 from the remaining portion of the transfer tape assembly 205.

Figure 15:
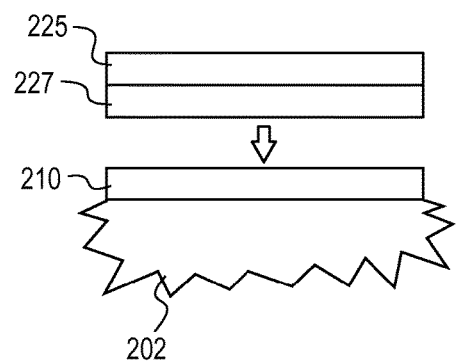
FIG. 15 is a schematic cross sectional view of application of a supplemental label assembly to the transfer tape assembly of FIG. 14.
Figure 16:
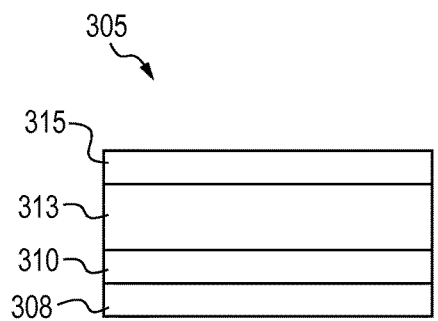
FIG. 16 is a schematic cross sectional view of a dry peel label assembly of another preferred embodiment label system in accordance with the present subject matter.

FIG. 15 illustrates application of a supplemental label assembly 225 having an exposed layer of another adhesive 227 disposed along an underside of the label assembly 225. In certain versions, the adhesive 227 may be a deep freeze adhesive. It will be appreciated that the supplemental label assembly 225 can include, and preferably includes, additional layers and components. These additional layers and components are collectively referenced by item 225. The supplemental label assembly 225 is then adhered to the remaining portion of the transfer tape assembly 205' adhered to the substrate 202. Preferably, the layer of the adhesive 227 of the supplemental label assembly 225 is contacted with the layer of the first adhesive 210 of the remaining portion of the first label assembly 205' adhered to the substrate 202.

In another preferred embodiment, a label system and/or an article utilizing the label system are provided. Furthermore, various methods related to the labeled system and labeled article are provided. Referring to FIGS. 16-19, a preferred embodiment label system comprises a dry peel label assembly 305 and a supplemental label assembly 325 configured for use with the dry peel label assembly 305. The dry peel label assembly 305 is used for labeling an article to be placed in cold storage. The dry peel label assembly 305 shown in FIG. 16 comprises an outer face material 315, a layer of a dry peel coating 313, a layer of an adhesive 310, and a release liner 308.

Figure 17:
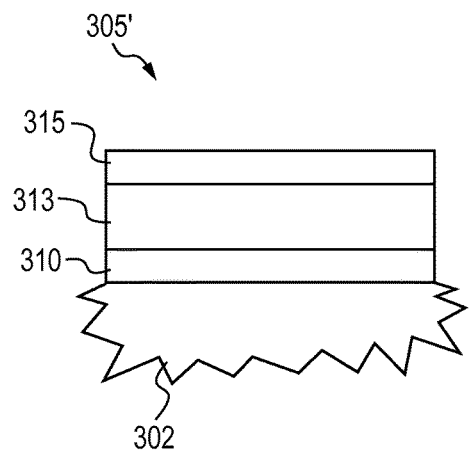
FIG. 17 is a schematic cross sectional view of the dry peel assembly depicted in FIG. 16 attached to a substrate.

FIG. 17 illustrates application of the dry peel label assembly to an article or substrate 302. Prior to application, the release liner 308 is removed to thereby expose the adhesive 310. The adhesive 310 bonds or adheres the dry peel label assembly to the substrate 302. After removal of the release liner 308, the first label assembly is designated as 305' in FIG. 17.

After removal of the labeled article or substrate from cold storage and exposure to warmer temperatures, as explained herein, typically a layer of moisture accumulates along an outer face of the face material 315. Depending upon the temperature of the dry peel label 305' and the substrate 302, the moisture may be in the form of liquid water or ice crystals. This layer of moisture is shown in FIG. 18 as layer 319.

Figure 18:
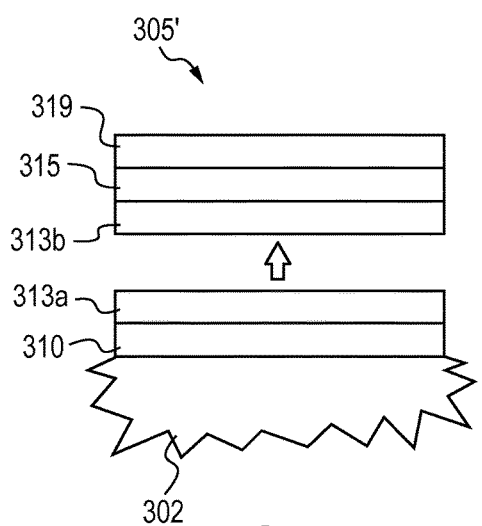
FIG. 18 is a schematic cross sectional view of the dry peel assembly of FIG. 17 and removal of an outer layer and a layer of moisture such as condensation or frost.

FIG. 18 illustrates removal of the layer of moisture 319 by removing the face material 315 and a portion of the dry peel coating layer 313. Specifically, the dry peel coating layer 313 splits or otherwise separates into an upper portion 313b carried with the face material 315 and a lower portion 313a remaining with the adhesive 310.

Figure 19:
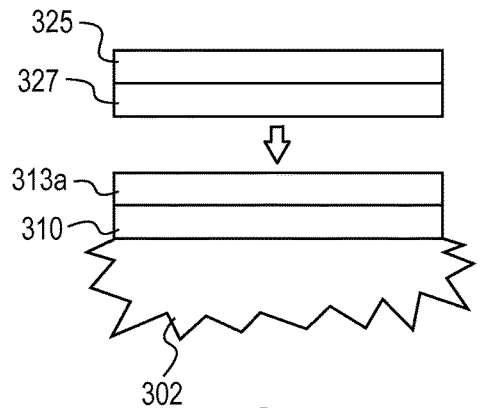
FIG. 19 is a schematic cross sectional view of application of a supplemental label assembly to the dry peel assembly of FIG. 18.
Figure 20:
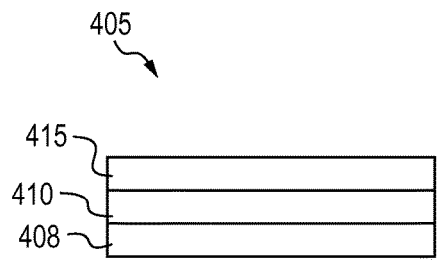
FIG. 20 is a schematic cross sectional view of an ice removing label assembly of another preferred embodiment label system in accordance with the present subject matter.

FIG. 19 illustrates application of a supplemental label assembly 325 having an exposed layer of an adhesive 327 disposed along an underside of the label assembly 325. In certain versions, the adhesive 327 may be a deep freeze adhesive. It will be appreciated that the supplemental label assembly 325 can include, and preferably includes, additional layers and components. These additional layers and components are collectively referenced by item 325. The supplemental label assembly 325 is then adhered to the remaining portion of the dry peel label assembly 305' adhered to the substrate 302. Preferably, the layer of the adhesive 327 of the supplemental label assembly 325 is contacted with the layer of the lower portion of the dry peel coating 313a of the remaining portion of the dry peel label assembly 305' adhered to the substrate 302.

In another preferred embodiment, a label system and/or an article utilizing the label system are provided. Furthermore, various methods related to the labeled system and labeled article are provided. Referring to FIGS. 20-23, a preferred embodiment label system comprises an ice removing label assembly 405 and a supplemental label assembly 425 configured for use with the ice removing label assembly 405. The ice removing label assembly 405 is used for labeling an article to be placed in cold storage. The ice removing label assembly 405 shown in FIG. 20 comprises an outer face layer 415, a layer of an adhesive 410, and a release liner 408.

Figure 21:
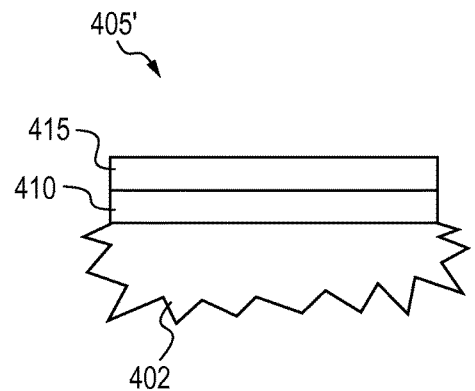
FIG. 21 is a schematic cross sectional view of the ice removing label assembly depicted in FIG. 20 attached to a substrate.

FIG. 21 illustrates application of the ice removing label assembly to an article or substrate 402. Prior to application, the release liner 408 is removed to thereby expose the adhesive 410. The adhesive 410 bonds or adheres the ice removing label assembly to the substrate 402. After removal of the release liner 408, the ice removing label assembly is designated as 405' in FIG. 21.

After removal of the labeled article or substrate from cold storage and exposure to warmer temperatures, as explained herein, typically a layer of ice accumulates along an outer face of the face layer 415. This layer of ice is shown in FIG. 22 as layer 419.

Figure 22:
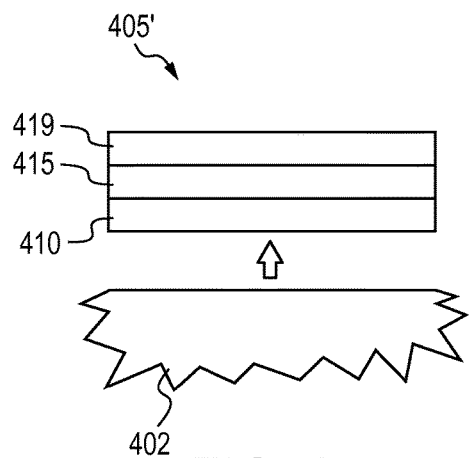
FIG. 22 is a schematic cross sectional view of the ice removing label assembly of FIG. 21 and removal of an outer layer, an adhesive layer, and a layer of ice.

FIG. 22 illustrates removal of the layer of ice 419 by removing the outer face layer 415 and the layer of adhesive 410 from the substrate 402.

Figure 23:
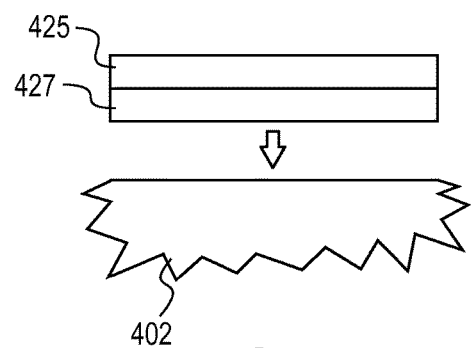
FIG. 23 is a schematic cross sectional view of application of a supplemental label assembly to a substrate after removal of the ice removing label assembly of FIG. 22.

FIG. 23 illustrates application of a supplemental label assembly 425 having an exposed layer of an adhesive 427 disposed along an underside of the label assembly 425. It will be appreciated that the supplemental label assembly 425 can include, and preferably includes, additional layers and components. These additional layers and components are collectively referenced by item 425. The supplemental label assembly 425 is then adhered to the substrate 402. Preferably, the layer of the adhesive 427 of the supplemental label assembly 425 is contacted with the substrate 402.

A wide array of materials can be used for the various layers and components described herein. The following is a representative description of such materials. It will be appreciated that in no way is the subject matter limited to any of these materials.

Substrate or Face Layer

The preferred embodiment label assemblies include a substrate, facestock film or layer to provide support for the label. The facestock layer can be formed from a wide array of materials such as polyester film materials, polyolefin film materials or paper, cardboard, or other paper-based materials. Representative materials for the outer support include, but are not limited to, polyethylene terephthalate (PET), polyethylene (PE), polypropylene (PP), both oriented and nonoriented, and copolymers thereof. Another example of a potentially suitable film for the facestock is a layer of polyvinyl chloride (PVC) and copolymers thereof. Additional materials include, but are not limited to, orthophthalaldehyde (OPA). For many applications, PET is preferred. In addition, it may be preferred to utilize a biaxially oriented polypropylene (BOPP) material. These materials provide cost savings as they are relatively inexpensive, and they have sufficient stiffness.

The facestock can be utilized at various thicknesses in the label assembly. The facestock can have a typical thickness of from about 10 to about 120 microns, preferably from about 25 to about 85 microns, more preferably from about 20 to about 60 microns, and most preferably from about 20 to about 35 microns.

Since the outer face of the facestock will likely constitute the outermost surface of the label, in certain embodiments, the material selected for the facestock, at least along this outwardly directed face, preferably exhibits attractive printability characteristics.

Printability is typically defined by the sharpness and brightness of the image and by ink anchorage. The sharpness is closely related to the surface tension of the print surface. The ink anchorage is often tested by a tape test (Final test: FTM21). In general, PVC is printable with a variety of inks intended to be used with PVC. In most occasions the inks are water-based (especially in the US) or designed for UV drying (especially in Europe). In general, all polyolefin films can be printed with UV inks after on-press corona treatment, PE being better than PP mainly on ink adhesion. For waterbased inks an additional primer or topcoat is preferred to achieve good ink anchorage.

Adhesive Layer

The preferred embodiment label assemblies include one or more adhesive layers. In one embodiment, the adhesive provides a tacky surface allowing a bond to another contacting surface. In certain applications, the properties of the adhesive are such that the bond also provides a seal to prevent or at least significantly prevent the flow of air or other agents across the region of the adhesive. The adhesive layer may be a single adhesive layer or may be a multilayer adhesive.

A wide range of adhesives can be used in this layer so long as their properties and characteristics are consistent with the packaging and/or application requirements of the resulting label assembly. The adhesive could be a hot melt pressure sensitive adhesive, such as for example, a rubber-based or acrylic-based pressure sensitive adhesive. The adhesive could be a UV cured hot melt. The adhesive could be based on a rubber-based hot melt composition, a solvent rubber adhesive, a solvent acrylic adhesive, or a solvent polyurethane adhesive. The adhesive could be emulsion-based such as an emulsion acrylic adhesive. As noted, a wide array of adhesives could be used. Each of the aforementioned adhesives are preferably in the form of a pressure sensitive adhesive (PSA). An extensive selection of various pressure sensitive adhesives are disclosed in U.S. Pat. Nos. 5,623,011; 5,830,571; and 6,147,165; owned by the assignee of the present application.

The thickness of the pressure sensitive adhesive layer typically ranges from about 5 to about 40 microns and preferably from about 15 to about 22 microns. It will be understood however, that the present subject matter includes using thicknesses greater than or lesser than these thicknesses. The adhesive layer typically has a coat weight of from about 5 to about 50 g/m², preferably from about 10 to about 30 g/m², and most preferably from about 15 to about 25 g/m².

In the noted embodiments, the adhesive, e.g., the adhesive in layers 14 and 114, can be in a wide range of formulations. For example, the adhesive can comprise one or more acrylic components such as 2-ethylhexyl acrylate, butyl acrylate, and other acrylic and methacrylic esters. The adhesives can also be in the form of hot melt adhesives based upon block copolymers of styrene isoprene, styrene butadiene, and/or blends thereof. The adhesives can also be in the form of rubber based adhesives based upon styrene butadiene rubber (SBR), polyisobutylene and the like.

Preferably, the adhesives exhibit a glass transition temperature (Tg), as measured via rheology, less than −10° C., more preferably less than −20° C., and most preferably less than −30° C.

Regarding the adhesive used to adhere a label or label assembly to the outer surface of a blood bag, e.g., layers 10, 110, 210, 310, and 410, these are typically acrylic adhesives and may optionally include one or more tackifiers. In addition to or instead of acrylic adhesives, other adhesives may be used such as solvent adhesives, hot melt adhesives, and/or emulsion adhesives.

Concerning the noted adhesives, e.g., layer 427, any of the previously noted adhesives could potentially be used for this adhesive.

Release Layer

In many of the embodiments described herein, the label assembly includes one or more of a release or liner layer. Preferably, the release layer is disposed immediately adjacent to the adhesive layer in the label. The release layer provides a release surface which is immediately adjacent to, and in contact with, the adhesive layer.

A wide variety of release materials such as those typically used for pressure sensitive tapes and labels are known, including silicones, alkyds, stearyl derivatives of vinyl polymers (such as polyvinyl stearyl carbamate), stearate chromic chloride, stearamides and the like. Fluorocarbon polymer coated release liners are also known but are relatively expensive. For most pressure sensitive adhesive applications, silicones are by far the most frequently used materials. Silicone release coatings have easy release at both high and low peel rates, making them suitable for a variety of production methods and applications.

Known silicone release coating systems generally include a reactive silicone polymer, e.g., an organopolysiloxane (often referred to as a "polysiloxane," or simply, "siloxane"); a cross-linker; and a catalyst. After being applied to the adjacent layer or other substrate, the coating generally must be cured to cross-link the silicone polymer chains, either thermally or radiatively (by, e.g., ultraviolet or electron beam irradiation).

Based on the manner in which they are applied, three basic types of silicone release coatings used in the pressure sensitive adhesive industry are known: solvent borne, water borne emulsions, and solvent free coatings. Each type has advantages and disadvantages. Solvent borne silicone release coatings have been used extensively but, because they employ a hydrocarbon solvent, their use in recent years has tapered off due to increasingly strict air pollution regulations, high energy requirements, and high cost. Indeed, the energy requirements of solvent recovery or incineration generally exceed that of the coating operation itself.

Water borne silicone emulsion release systems are as well known as solvent systems, and have been used on a variety of pressure sensitive products, including tapes, floor tiles, and vinyl wall coverings. Their use has been limited, however, by problems associated with applying them to paper substrates. Water swells paper fibers, destroying the dimensional stability of the release liner backing and causing sheet curling and subsequent processing difficulties.

Solventless or solvent free silicone release coatings have grown in recent years and now represent a major segment of the silicone release coating market. Like other silicone coatings, they must be cured after being applied to the flexible liner substrate. Curing produces a cross-linked film that resists penetration by the pressure sensitive adhesive.

Informative descriptions of various release materials, their characteristics, and incorporation in laminate assemblies are provided in U.S. Pat. Nos. 5,728,469; 6,486,267; and US Published Patent Application 2005/0074549, owned by the assignee of the present application. It is also contemplated that various waxes known in the art could be used for the release material or utilized in the release layer.

The preferred labels utilize release layers that are relatively thin. For example, a typical release layer thickness is from about 0.2 to about 4 microns. Preferably, the thickness of the release layer is from about 0.5 to about 1.5 microns.

Dry Peel Layer

It is contemplated that a wide array of materials can be used for the noted dry peel layer, e.g., layer 313. For example, any suitable polyolefin could be used. Polypropylene is preferred.

It is also contemplated that the preferred embodiment label assemblies can also comprise one or more additional layers such as a secondary substrate, a topcoat, a sealing layer, a protective layer, and combinations thereof.

Many other benefits will no doubt become apparent from future application and development of this technology.

All patents, applications, and articles noted herein are hereby incorporated by reference in their entirety.

In addition, it will be understood that the subject matter includes all combinations of the various components described herein. For example, the subject matter includes label systems comprising certain components of one embodiment described herein and component(s) from other embodiment(s) described herein.

As described hereinabove, the present subject matter solves many problems associated with previous labels and labeling practices. However, it will be appreciated that various changes in the details, materials and arrangements of components, which have been herein described as illustrated in order to explain the nature of the subject matter, may be made by those skilled in the art without departing from the principle and scope of the subject matter, as expressed in the appended claims.

What is claimed is:

1. A label system comprising:
a first label assembly adapted for use in cold environments, the first label assembly comprising:
an inner substrate;
a removable outer substrate;
a layer of a third adhesive disposed between and in contact with each of the inner substrate and the outer substrate, wherein the layer of the third adhesive comprises a pressure sensitive adhesive and is configured to remain with the inner substrate upon removal of the outer substrate; and
a layer of a first adhesive disposed along an underside of the inner substrate; and a supplemental label assembly not attached to the first label assembly prior to removal of the first label assembly removable outer substrate, wherein the supplemental label assembly is configured for application to the first label assembly upon removal of the first label assembly removable outer substrate, the supplemental label assembly comprising:
an outer substrate; and
a layer of a second adhesive disposed along an underside of the outer substrate of the supplemental label assembly.

2. The label system of claim 1 further comprising:
a release liner disposed along the layer of the first adhesive disposed along an underside of the inner substrate of the first label assembly.

3. The label system of claim 1 wherein the outer substrate of the first label assembly defines an outer face adapted for receiving print, indicia, or other markings.

4. The label system of claim 1 further comprising:
a release liner disposed along the layer of the second adhesive of the supplemental label assembly.

5. The label system of claim 1 wherein the outer substrate of the supplemental label assembly defines an outer face adapted for receiving print, indicia, or other markings.

6. A labeled blood bag defining an outer surface and a label system including a first label assembly adhered to the outer surface and a supplemental label assembly,
the first label assembly comprising:
an inner substrate;
a layer of a first adhesive disposed between the inner substrate and the outer surface of the blood bag;
a removable outer substrate; and
a layer of a third adhesive disposed between and in contact with each of the inner substrate and the outer substrate, wherein the layer of the third adhesive comprises a pressure sensitive adhesive and is configured to remain with the inner substrate upon removal of the outer substrate; and
the supplemental label assembly comprising:
an outer substrate; and
a layer of a first adhesive disposed along an underside of the outer substrate of the supplemental label assembly; wherein
the supplemental label assembly is not attached to the first label assembly prior to removal of the first label assembly removal outer substrate, and wherein the supplemental label assembly is configured for application to the first label assembly layer of the third adhesive upon removal of the first label assembly removable outer substrate.

7. A label system comprising:
a first label assembly adapted for use in cold environments, the first label assembly comprising:
an inner substrate;
a removable first release liner;
a layer of a first adhesive disposed between and in contact with each of the inner substrate and the first release liner, wherein the layer of first adhesive comprises a pressure sensitive adhesive and is configured to remain with the inner substrate upon removal of the first release liner; and
a layer of adhesive disposed along an underside of the inner substrate; and a supplemental label assembly not attached to the first label assembly prior to removal of the first label assembly removable first release liner, wherein the supplemental label assembly is configured for application to the first label assembly upon removal of the first label assembly removal first release liner, the supplemental label assembly comprising:
an outer substrate; and
a layer of second adhesive disposed along an underside of the outer substrate of the supplemental label assembly.

8. The label system of claim 7 further comprising:
a second release liner disposed along the layer of the adhesive disposed along an underside of the inner substrate of the first label assembly.

9. The label system of claim 7 further comprising:
a release liner disposed along the layer of the adhesive disposed along an underside of the outer substrate of the supplemental label assembly.

* * * * *